US008847931B2

(12) United States Patent
Jeong et al.

(10) Patent No.: US 8,847,931 B2
(45) Date of Patent: Sep. 30, 2014

(54) DRIVING APPARATUS AND DRIVING METHOD OF LIQUID CRYSTAL DISPLAY

(75) Inventors: Jae-Won Jeong, Seoul (KR); Hoi Sik Moon, Asan-si (KR); Woo-Jin Jung, Seoul (KR); Woo-Young Lee, Daegu (KR); Kang-Hyun Kim, Seoul (KR); Duc-Han Cho, Incheon (KR); Su-Bin Park, Incheon (KR)

(73) Assignee: Samsung Display Co., Ltd. (KR)

( * ) Notice: Subject to any disclaimer, the term of this patent is extended or adjusted under 35 U.S.C. 154(b) by 168 days.

(21) Appl. No.: 13/242,443

(22) Filed: Sep. 23, 2011

(65) Prior Publication Data

US 2012/0293466 A1 Nov. 22, 2012

(30) Foreign Application Priority Data

May 18, 2011 (KR) ........................ 10-2011-0046836

(51) Int. Cl.
*G06F 3/038* (2013.01)
*G09G 3/36* (2006.01)

(52) U.S. Cl.
CPC .......... *G09G 3/3648* (2013.01); *G09G 2310/08* (2013.01); *G09G 2320/0209* (2013.01); *G09G 2320/0233* (2013.01); *G09G 2340/16* (2013.01); *G09G 2310/067* (2013.01)
USPC ................. 345/204; 345/87; 345/89; 345/92; 345/100

(58) Field of Classification Search
CPC .............. G09G 3/3614; G09G 3/3677; G09G 2320/0233; G09G 3/3648; G09G 2310/0251
USPC ................................ 345/87, 89, 92, 100, 204
See application file for complete search history.

(56) References Cited

U.S. PATENT DOCUMENTS

| | | | | |
|---|---|---|---|---|
| 5,568,163 | A * | 10/1996 | Okumura | 345/100 |
| 6,288,699 | B1 * | 9/2001 | Kubota et al. | 345/99 |
| 6,456,268 | B1 * | 9/2002 | Takeda | 345/92 |
| 6,720,943 | B1 * | 4/2004 | Lee et al. | 345/87 |
| 6,727,878 | B2 * | 4/2004 | Okuzono et al. | 345/96 |
| 6,734,840 | B2 * | 5/2004 | Fukutoku et al. | 345/96 |
| 6,911,967 | B2 * | 6/2005 | Okuzono et al. | 345/96 |
| 6,982,693 | B2 * | 1/2006 | Okuzono et al. | 345/96 |
| 7,079,097 | B2 * | 7/2006 | Lee | 345/87 |
| 7,154,464 | B2 * | 12/2006 | Lee et al. | 345/96 |
| 7,456,816 | B2 * | 11/2008 | Chen | 345/98 |
| 7,586,476 | B2 * | 9/2009 | Kwon et al. | 345/98 |
| 7,746,312 | B2 * | 6/2010 | Lee et al. | 345/99 |
| 7,768,490 | B2 * | 8/2010 | Huang et al. | 345/96 |
| 8,199,099 | B2 * | 6/2012 | Kwon et al. | 345/100 |
| 2001/0004253 | A1 * | 6/2001 | Fukutoku et al. | 345/96 |
| 2001/0043178 | A1 * | 11/2001 | Okuzono et al. | 345/87 |
| 2003/0038766 | A1 * | 2/2003 | Lee et al. | 345/87 |
| 2004/0021625 | A1 * | 2/2004 | Lee | 345/87 |

(Continued)

*Primary Examiner* — Olga Merkoulova
*Assistant Examiner* — Peter D McLoone
(74) *Attorney, Agent, or Firm* — Cantor Colburn LLP

(57) ABSTRACT

A driving apparatus of a liquid crystal display includes a signal modification unit which modifies a signal based on a data signal input to the liquid crystal display, where the signal modification unit determines whether the data signal corresponds to an image to be displayed with a quality deterioration and outputs at least one of a first signal and a second signal, where the first signal is output when the signal modification unit determines the data signal corresponds to the image to be displayed with the quality deterioration, and where the second signal is output when the signal modification unit determines the data signal does not corresponds to the image to be displayed with the quality deterioration.

20 Claims, 11 Drawing Sheets

(56) References Cited

U.S. PATENT DOCUMENTS

| | | | | |
|---|---|---|---|---|
| 2004/0070851 | A1* | 4/2004 | Koba et al. | 359/813 |
| 2004/0095308 | A1* | 5/2004 | Kim et al. | 345/99 |
| 2004/0150604 | A1* | 8/2004 | Okuzono et al. | 345/98 |
| 2004/0150612 | A1* | 8/2004 | Okuzono et al. | 345/100 |
| 2004/0252093 | A1* | 12/2004 | Park | 345/94 |
| 2005/0258780 | A1* | 11/2005 | Chen | 315/291 |
| 2006/0221035 | A1* | 10/2006 | Lee | 345/94 |
| 2006/0284815 | A1* | 12/2006 | Kwon et al. | 345/98 |
| 2007/0120802 | A1 | 5/2007 | Lee et al. | |
| 2008/0024417 | A1* | 1/2008 | Huang et al. | 345/98 |
| 2009/0295784 | A1* | 12/2009 | Kwon et al. | 345/213 |
| 2011/0037760 | A1* | 2/2011 | Kim et al. | 345/214 |

* cited by examiner

DRIVING APPARATUS AND DRIVING METHOD OF LIQUID CRYSTAL DISPLAY

This application claims priority to Korean Patent Application No. 10-2011-0046836, filed on May 18, 2011, and all the benefits accruing therefrom under 35 U.S.C. §119, the content of which in its entirety is herein incorporated by reference.

BACKGROUND OF THE INVENTION (a) Field of the Invention

Exemplary embodiments of the invention relate to a driving apparatus and a driving method of a liquid crystal display.

(b) Description of the Related Art

A liquid crystal display is one of the most widely used types of a flat panel display, and typically includes two display panels on which field generating electrodes, such as pixel electrodes and a common electrode, are provided, and a liquid crystal layer interposed between the two display panels. A voltage is applied to the field generating electrodes to generate an electric field in the liquid crystal layer, and the orientation of liquid crystal molecules of the liquid crystal layer and the polarization of incident light is controlled by the generated electric field to display an image.

Vertical lines due to crosstalk may be recognized in the liquid crystal display. To effectively prevent display deteriorations such as the vertical lines due to crosstalk, the duration of a gate-on signal may be increased to increase the charging time of the liquid crystal layer. However, when the duration of the gate-on signal is consecutively increased, the gray may overlap, and thus colors may be generated non-uniformly.

BRIEF SUMMARY OF THE INVENTION

Exemplary embodiments of the invention provide a liquid crystal display which prevents display quality deterioration due to crosstalk, and a driving method thereof.

In an exemplary embodiment, a driving apparatus of a liquid crystal display includes a signal modification unit which modifies a signal based on a data signal input to the liquid crystal display, where the signal modification unit determines whether the data signal corresponds to an image to be displayed with a quality deterioration and outputs at least one of a first signal and a second signal, where the first signal is output when the signal modification unit determines the data signal corresponds to the image to be displayed with the quality deterioration, and where the second signal is output when the signal modification unit determines the data signal does not corresponds to the image to be displayed with the quality deterioration.

In an exemplary embodiment, the first signal and the second signal may be control signals of a gate signal, and a duration of a gate-on signal corresponding to the first signal may be greater than a duration of a gate-on signal corresponding to the second signal.

In an exemplary embodiment, the signal modification unit may include a line memory which stores the data signal input to a first data line of the liquid crystal display.

In an exemplary embodiment, the signal modification unit may compare the data signals stored in the line memory with the data signal input to a second data line of the liquid crystal display.

In an exemplary embodiment, the driving apparatus may include a frame memory which stores data signals input during a previous frame, where the signal modification unit may compare the data signals stored in the frame memory with data signals input during a current frame.

In an exemplary embodiment, the signal modification unit may include a comparator which compares a common voltage of the liquid crystal display with a predetermined reference value.

In an exemplary embodiment, a driving method of a liquid crystal display includes determining whether a data signal input to the liquid crystal display corresponds to an image to be displayed with a display quality deterioration based on an data signal input to the liquid crystal display, and outputting at least one of a first signal and a second signal based on the determining whether the data signal corresponds to the image to be displayed with the display quality deterioration, where the first signal is output when the data signal corresponds to the image to be displayed with the quality deterioration, and where the second signal is output when the data signal does not corresponds to the image to be displayed with the quality deterioration.

In an exemplary embodiment, the first signal and the second signal may be control signals of a gate signal, and a duration of a gate-on signal corresponding to the first signal may be greater than a duration of a gate-on signal corresponding to the second signal.

In an exemplary embodiment, the determining whether the data signal input to the liquid crystal display corresponds to the image to be displayed with the display quality deterioration may include comparing a data signal input to a first data line and stored in a frame memory with a data signal input to a second data line.

In an exemplary embodiment, the determining whether the data signal input to the liquid crystal display corresponds to the image to be displayed with the display quality deterioration may include comparing data signals during a previous frame and stored in a frame memory with data signals currently input.

In an exemplary embodiment, the determining whether the data signal input to the liquid crystal display corresponds to the image to be displayed with the display quality deterioration may include comparing a common voltage of the liquid crystal display with a predetermined reference value.

In an exemplary embodiment, the duration of the gate-on signal is controlled based on determining whether the data signal corresponds to an image to be displayed with the display quality deterioration, and the display quality deterioration due to crosstalk such as a vertical line and the non-uniformity due to the overlapping of the data by limiting increasing of the duration of the gate-on signal are thereby effectively prevented.

BRIEF DESCRIPTION OF THE DRAWINGS

The above and other aspects and features of the invention will become more apparent by describing in further detail exemplary embodiments thereof with reference to the accompanying drawings, in which.

DETAILED DESCRIPTION OF THE INVENTION

Figure 1:
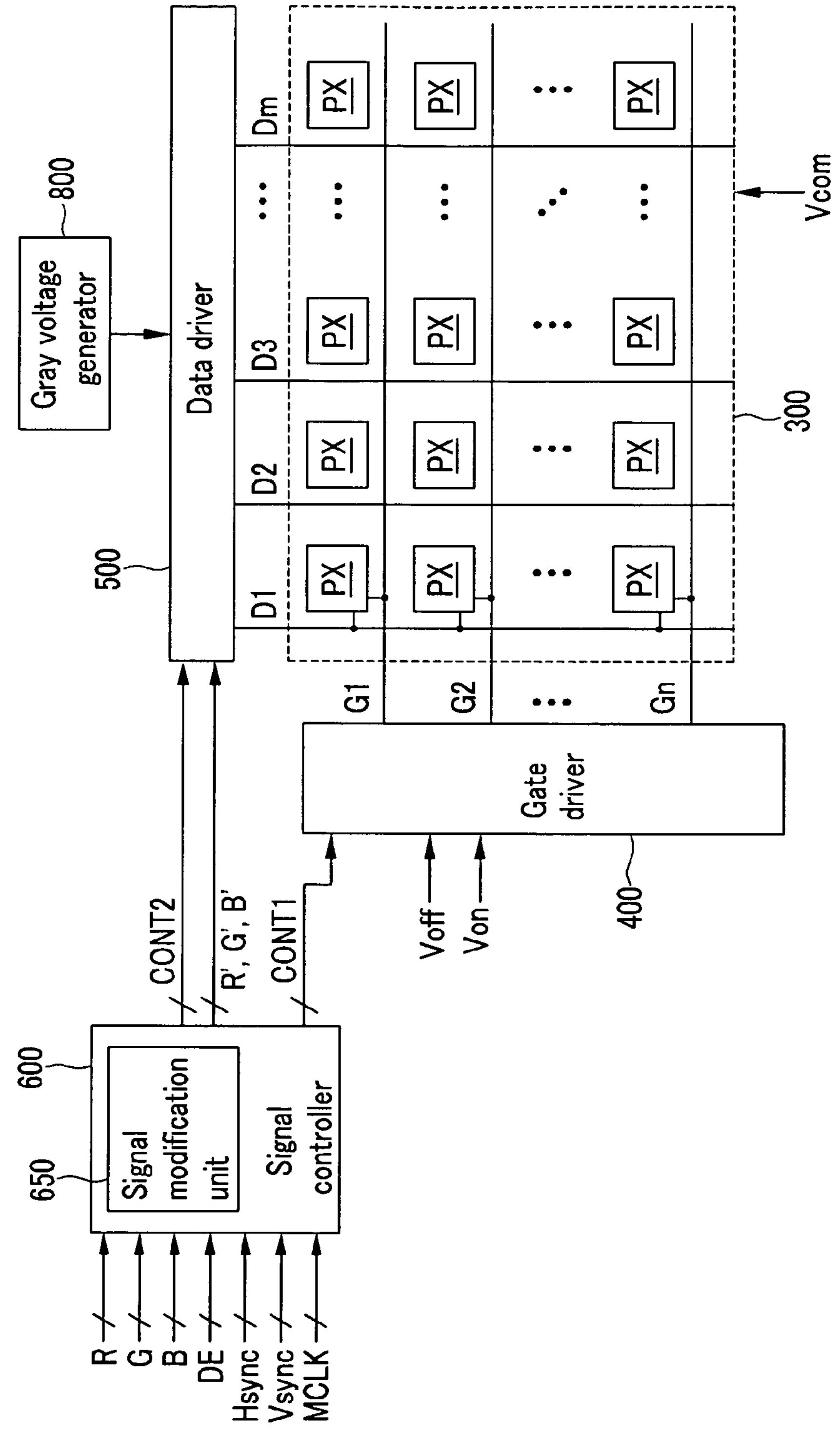
FIG. 1 is a block diagram of an exemplary embodiment of a liquid crystal display according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described with reference to accompany drawings.

Firstly, an exemplary embodiment of a liquid crystal display according to the invention will be described with reference to FIGS. 1 and 2.

Figure 2:
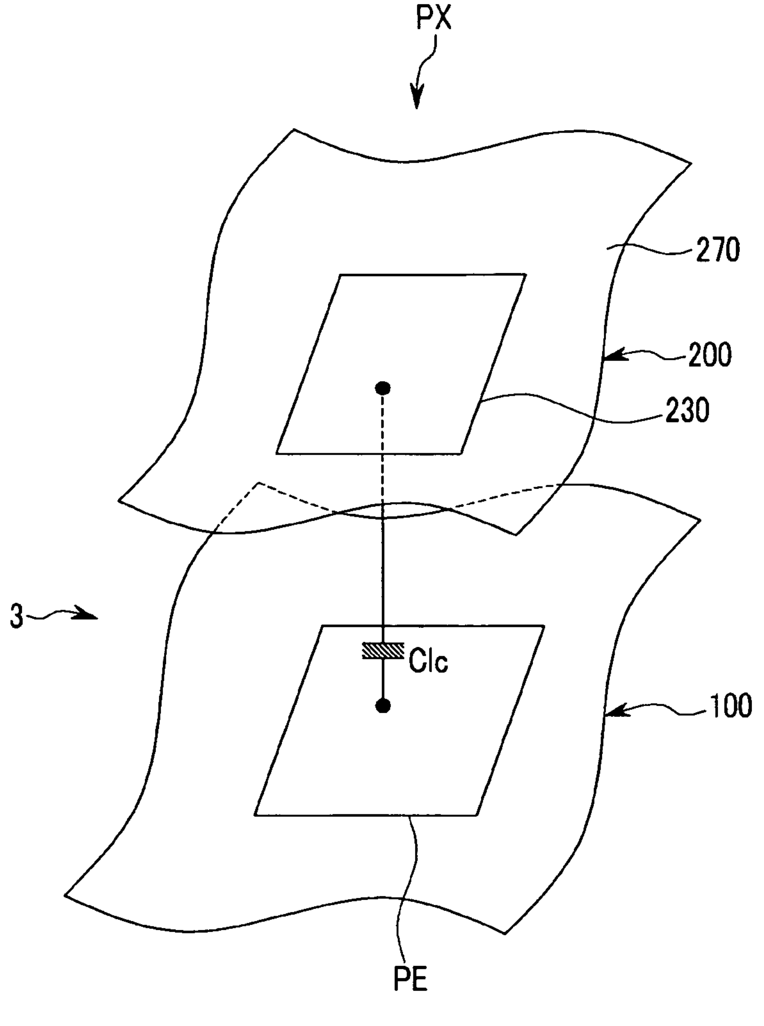
FIG. 2 is an equivalent circuit diagram showing an exemplary embodiment of a single pixel of a liquid crystal display according to the invention.

FIG. 1 is a block diagram showing an exemplary embodiment of a liquid crystal display according to the invention, and FIG. 2 is an equivalent circuit diagram showing an exemplary embodiment of a single pixel of a liquid crystal display according to the invention.

Referring to FIG. 1, an exemplary embodiment of a liquid crystal display includes a liquid crystal panel assembly 300, a gate driver 400, a data driver 500, a gray voltage generator 800 and a signal controller 600. In an exemplary embodiment, the signal controller 600 includes a signal modification unit 650 disposed therein. In an alternative exemplary embodiment, the signal modification unit 650 may be disposed outside the signal controller 600.

Referring to FIG. 1, the liquid crystal panel assembly 300 includes a plurality of signal lines G1 to Gn and D1 to Dm, and a plurality of pixels PX arranged substantially in a matrix form. As shown in FIG. 2, the liquid crystal panel assembly 300 includes a lower panel 100 and an upper panel 200 disposed opposite to, e.g., facing, each other, and a liquid crystal layer 3 interposed between the lower panel 100 and the upper panel 200.

The signal lines G1 to Gn and D1 to Dm include a plurality of gate lines G1 to Gn that transmits gate signals (referred to as "scanning signals"), and a plurality of data lines D1 to Dm that transmits a data voltage. In an exemplary embodiment, the gate lines G1 to Gn are arranged substantially in parallel to each other and extend substantially in a row direction, and the data lines D1 to Dm are arranged substantially in parallel to each other and extend substantially in a column direction.

Each pixel PX, e.g., a pixel PX connected to an i-th gate line Gi (i=1, 2, . . . , n) and a j-th data line Dj (j=1, 2, . . . , m), includes a switching element that is connected to a corresponding signal lines, e.g., the i-th gate line Gi and the j-th data line Dj, and a liquid crystal capacitor Clc and a storage capacitor Cst connected to the corresponding signal lines. In an alternative exemplary embodiment, the storage capacitor Cst may be omitted.

The switching element is a three terminal element, e.g., a thin film transistor, and is provided to the lower panel 100. In an exemplary embodiment, a control terminal of the switching element is connected to the gate line Gi of the corresponding signal lines, an input terminal of the switching element is connected to the data line Dj of the corresponding signal lines, and an output terminal of the switching element is connected to the liquid crystal capacitor Clc and the storage capacitor Cst.

The liquid crystal capacitor Clc has two terminals, which are a pixel electrode PE of the lower panel 100 and a common electrode 270 of the upper panel 200. The liquid crystal layer 3 between the pixel and common electrodes 191 and 270 serves as a dielectric material. In an exemplary embodiment, as shown in FIG. 2, the pixel electrode 191 is connected to the switching element, and the common electrode 270 is disposed on the whole surface of the upper panel 200 and receives a common voltage Vcom. In an alternative exemplary embodiment, the common electrode 270 may be disposed on the lower panel 100, and at least one of the pixel and common electrodes 191 and 270 may have a linear shape or a bar shape, differently from the exemplary embodiment shown in FIG. 2.

The storage capacitor Cst that serves as an auxiliary to the liquid crystal capacitor Clc is defined by a separate signal line (not shown) provided on the lower panel 100 and the pixel electrode 191 overlapping the separate signal line with an insulator interposed therebetween, and a predetermined voltage, e.g., a common voltage Vcom, is applied to the separate signal line. However, the storage capacitor Cst may be formed by the pixel electrode 191 and the overlying previous gate line Gi−1 that are arranged to overlap each other via the insulator.

For color display, each pixel PX uniquely represents one of primary colors (i.e., spatial division) or each pixel PX sequentially represents the primary colors in turn (i.e., temporal division), such that a spatial or temporal sum of the primary colors is recognized as a desired color. In one exemplary embodiment, for example, a set of the primary colors includes red, green and blue colors. As shown in FIG. 2, each pixel PX includes a color filter 230 representing one of the primary colors in an area of the lower panel 100 corresponding to the pixel electrode 191. The color filter 230 may include an organic insulator.

At least one polarizer (not shown) that provides light polarization is provided in the liquid crystal panel assembly 300.

Next, an exemplary embodiment of a driving apparatus of a liquid crystal display according to the invention will be described.

Referring again to FIG. 1, the gray voltage generator 800 generates all gray voltages or a predetermined number of gray voltages (or reference gray voltages) related to transmittance of the pixels PX. The gray voltages may include a first set having a positive value with respect to the common voltage Vcom, and a second set having a negative value with respect to the common voltage Vcom.

The gate driver 400 is connected to the gate lines G1 to Gn of the liquid crystal panel assembly 300, and applies gate signals obtained by combining a gate-on voltage Von and a gate-off voltage Voff to the gate lines G1 to Gn.

The data driver 500 is connected to the data lines D1 to Dm of the liquid crystal panel assembly 300, and selects the gray voltages from the gray voltage generator 800 to apply the gray voltages to the data lines D1 to Dm as data voltages. In an exemplary embodiment, the gray voltage generator 800 supplies only a predetermined number of reference gray voltages, and the data driver 500 divides the reference gray voltages to generate the data voltages.

The signal controller 600 controls the gate driver 400 and the data driver 500. The signal controller 600 includes the signal modification unit 650.

In an exemplary embodiment, each of the gate driver 400, the data driver 500, the signal controller 600 and the gray voltage generator 800 may be directly mounted on the liquid crystal panel assembly 300 in the form of at least one integrated circuit ("IC") chip. In an alternative exemplary embodiment, each of the gate driver 400, the data driver 500, the signal controller 600 and the gray voltage generator 800 may be mounted on a flexible printed circuit film (not shown) and then mounted on the liquid crystal panel assembly 300 in the form of a tape carrier package ("TCP"), or may be mounted on a separate printed circuit board (not shown). In an exemplary embodiment, the gate driver 400, the data driver 500, the signal controller 600 and the gray voltage generator 800 may be integrated with the liquid crystal panel assembly 300 together with, for example, the signal lines G1 to Gn and D1 to Dm and the thin film transistor switching element. In an exemplary embodiment, the gate driver 400, the data driver 500, the signal controller 600 and the gray voltage generator 800 may be integrated into a single chip. In an alternative exemplary embodiment, at least one of the drivers or at least one circuit forming the drivers may be arranged outside the single chip.

Hereinafter, an operation of the liquid crystal display will be described.

The signal controller 600 receives input image signals R, G and B and an input control signal to control the display of the image signals R, G and B from outside, e.g., from a graphics controller (not shown). The input image signals R, G and B contain luminance information of each pixel PX. The luminance information corresponds to a predetermined number of grays, such as $1024=2^{10}$, $256=2^{8}$, or $64=2^{6}$. In an exemplary embodiment, the input control signals may include a vertical synchronization signal Vsync, a horizontal synchronizing signal Hsync, a main clock signal MCLK and a data enable signal DE, for example.

The signal controller 600 processes the input image signals R, G and B based on the operating conditions of the display panel assembly 300 and the input image signals R, G and B, and generates a gate control signal CONT1 and a data control signal CONT2. The signal controller 600 outputs the gate control signal CONT1 to the gate driver 400, and outputs the data control signal CONT2 and modification image signals R', G' and B' to the data driver 500.

In an exemplary embodiment, the image signal modification unit 650 of the signal controller 600 modifies the input image signals R, G and B based on a change in values of the data signal or the common voltage to prevent deterioration of display quality due to crosstalk, which will be described later in greater detail.

The image scan control signal CONT1 includes an image scanning start signal STV to command a start of image scanning, and at least one clock signal to control an output cycle of the gate-on voltage. The image scan control signal CONT1 may further include an output enable signal to define a duration of the gate-on voltage.

The image data control signal CONT2 includes a horizontal synchronization start signal to inform a start of transmission of digital image data for one column of pixels PX, a load signal to command the analog data voltage to be applied to the data lines D1 to Dm, and a data clock signal. The data control signal CONT2 may further include an inversion signal that inverts the voltage polarity of the data voltage for the common voltage Vcom. Hereinafter, the data signal polarity denotes the voltage polarity of the data signal with respect to the common voltage.

The data driver 500 receives modification image signals R', G' and B' for a column of pixels, and selects gray voltages corresponding to the modification image signals R', G' and B' based on the data control signal CONT2 from the signal controller 600 to convert the modification image signals R', G' and B' to analog data signals. Then, the analog data signals are supplied to corresponding data lines D1 to Dm.

The gate driver 400 supplies a gate-on voltage Von to the gate lines G1 to Gn based on a gate control signal CONT1 from the signal controller 600, and a switching element Q connected to the gate lines G1 to Gn is thereby turned on. The data voltage transmitted to the data lines D1 to Dm is supplied to a corresponding pixel PX through the turned-on switching element.

A difference between a voltage of the data signal applied to the pixels PX and the common voltage Vcom is expressed as a charged voltage of the liquid crystal capacitor Clc, that is, a pixel voltage. An arrangement of the liquid crystal molecules varies according to the magnitude of the pixel voltage to change the polarization of light passing through the liquid crystal layer 3. The transmittance of the light is changed by a polarizer according to the change in the polarization such that the pixel PX displays luminance corresponding to the gray of the image signals.

In units of one horizontal period, which may be written as "1H" and is the same as one period of the horizontal synchronization signal Hsync and the data enable signal DE, the aforementioned operations are repeatedly performed to sequentially apply the gate-on voltages Von to all the gate lines G1 to Gn, such that the data signals are applied to all the pixels PX. As a result, one frame of the image is displayed.

In an exemplary embodiment, when one frame ends and a next frame starts, a state of the reverse signal applied to the data driver 500 is controlled such that the polarity of the data signal applied to each of the pixels is opposite to the polarity of the data signal in a previous frame (frame inversion). In such an embodiment, the polarity of the data signal flowing through the one data line may be inverted based on the characteristics of the reverse signals even during the one frame (row inversion and dot inversion or, the polarities of the data signals applied to the one pixel row may be different from each other (column inversion and dot inversion). An exemplary embodiment of the liquid crystal display that modifies input signals based on characteristics of the inversion signal for preventing the flicker phenomenon will be described later in greater detail.

Next, a structure and an operation of an exemplary embodiment of the signal modification unit 650 of the signal controller 600 of the liquid crystal display will be described with reference to FIG. 3 to FIG. 6.

Figure 3:
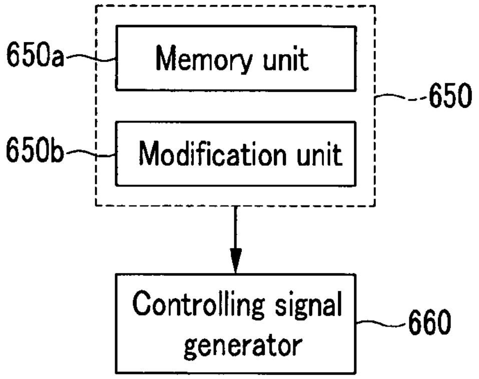
FIG. 3 is a block diagram of an exemplary embodiment of a signal modification unit according to the invention.
Figure 4:
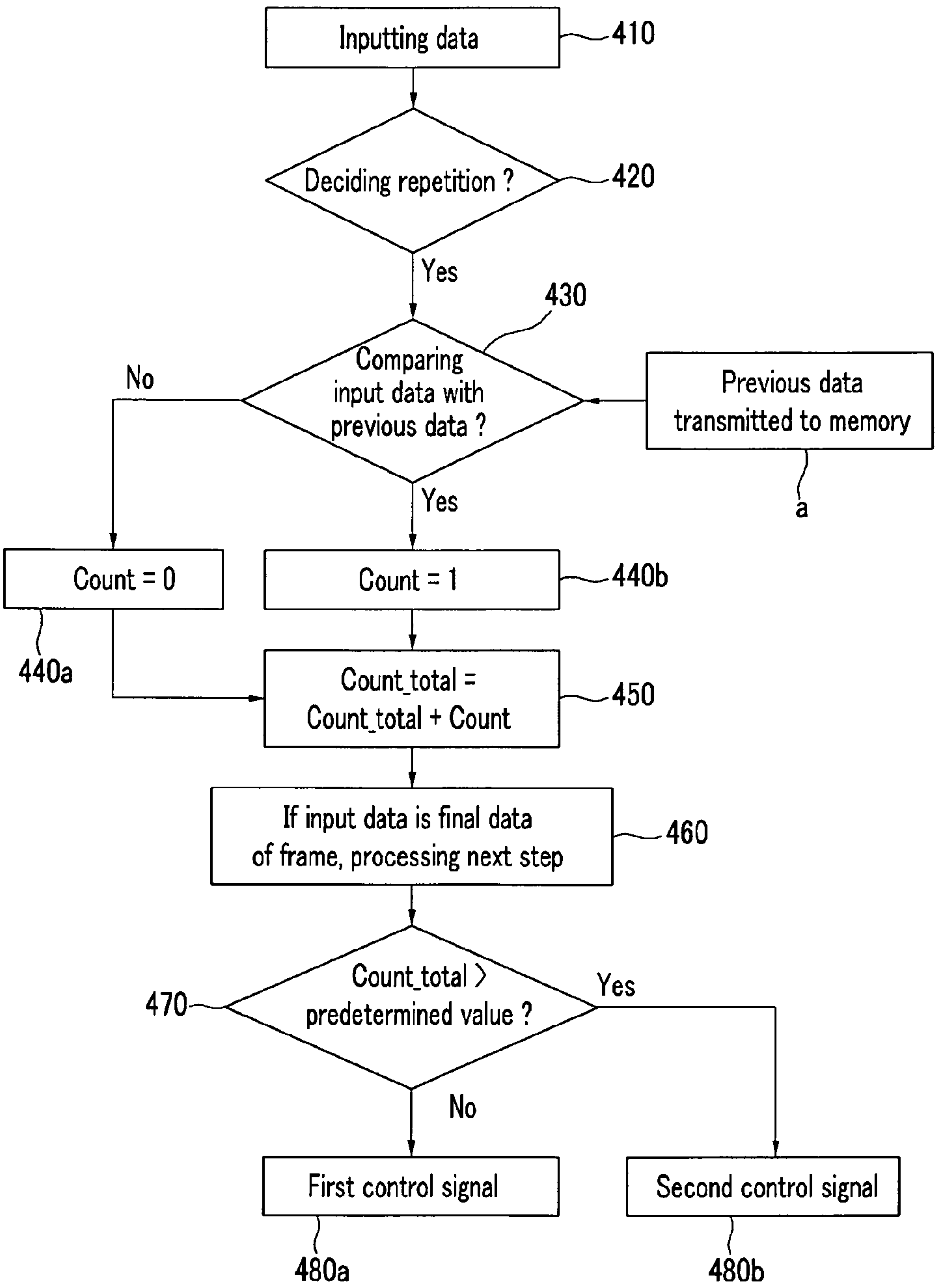
FIG. 4 is a flowchart showing an exemplary embodiment of a signal modification method according to the invention.
Figure 5:
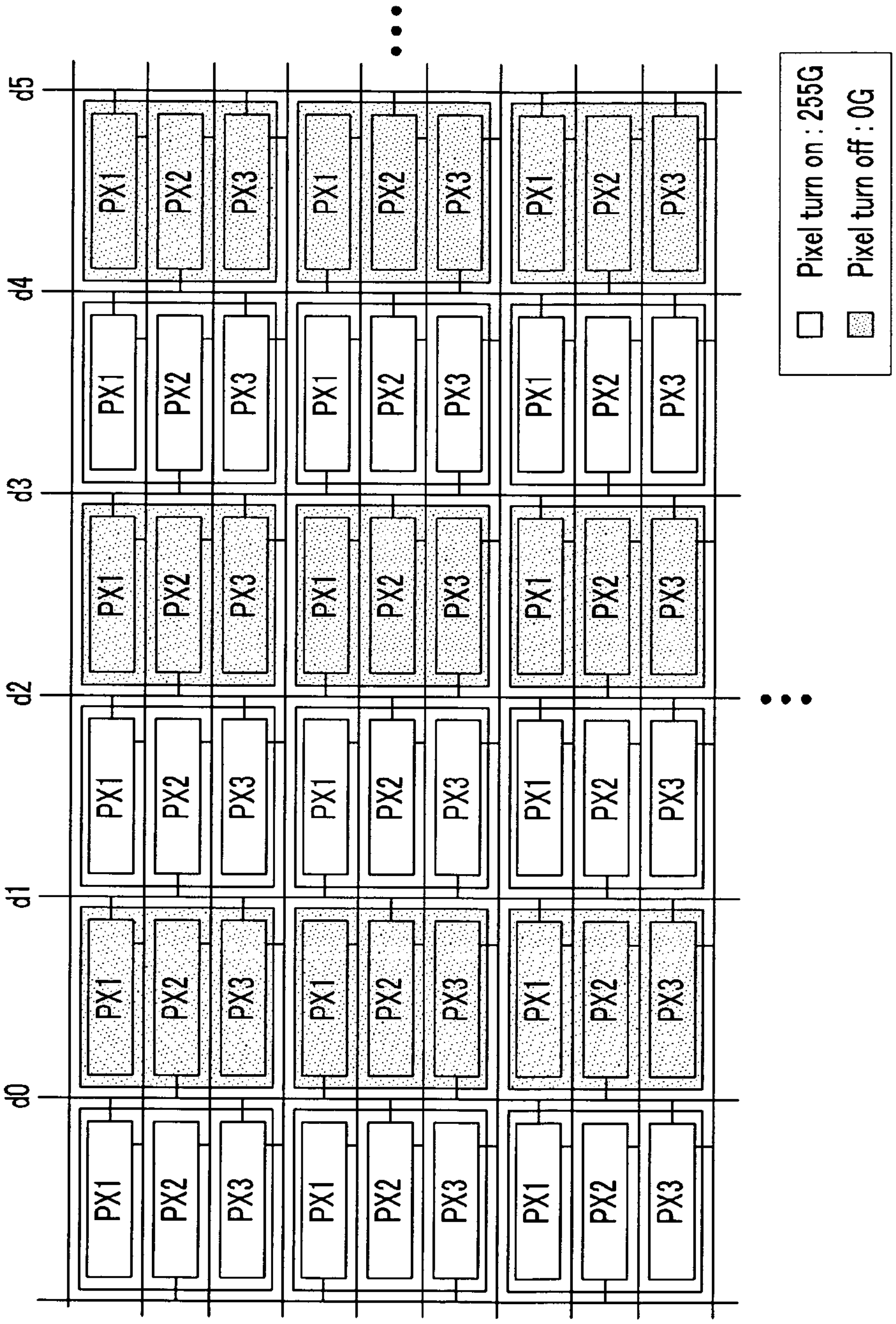
FIG. 5 is a block diagram showing data lines and pixels of an exemplary embodiment of a liquid crystal display according to the invention.
Figure 6:
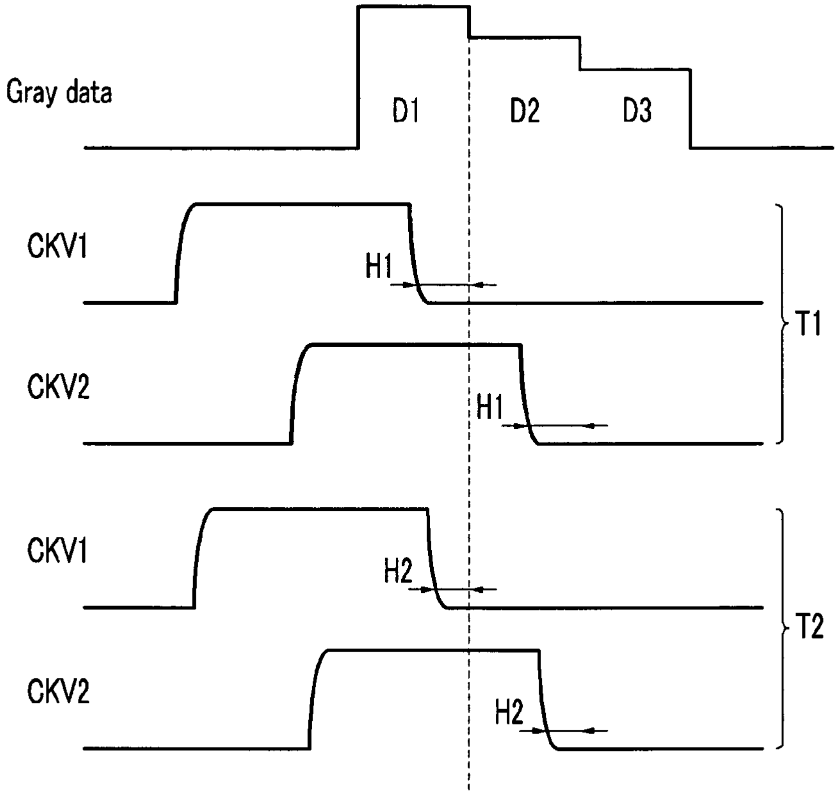
FIG. 6 is a signal timing diagram showing an exemplary embodiment of a gate-on signal according to the invention.

FIG. 3 is a block diagram of an exemplary embodiment of a signal modification unit according to the invention, FIG. 4 is a flowchart showing an exemplary embodiment of a signal modification method according to the invention, FIG. 5 is a block diagram showing data lines and pixels of an exemplary embodiment of a liquid crystal display according to the invention, and FIG. 6 is a signal timing diagram showing an exemplary embodiment of a gate-on signal according to the invention.

Referring to FIG. 3, the signal modification unit 650 includes a memory unit 650*a* and a modification unit 650*b*. The memory unit 650*a* of the signal modification unit 650 stores a value of a data signal of a previous column line.

The memory unit 650*a* may be an electrically erasable programmable read-only memory ("EEPROM"), and the value of the data signal of the previous column line is stored therein such that the size of the memory unit 650*a* may be substantially reduced.

The modification unit 650*b* compares a value of the data signals input to a current column line (or during a current frame) with a value of the data signals of the previous column line (or during a previous frame) stored in the memory unit 650*a*, and determines whether the data signal input to the current column line changes the value of the common voltage Vcom due to crosstalk, and then transmits a result thereof to a control signal generator 660 to selectively change the control signal that controls the gate-on signal.

In an exemplary embodiment, driving apparatus of the liquid crystal display, e.g., the gate driver 400, the data driver 500, the signal controller 600 and the gray voltage generator 800, are integrated into a single chip, e.g., a single IC chip, and a timing controller may be integrated in the single IC chip. In such an embodiment, the signal modification unit 650 may also be included in the single IC chip.

Next, the operation of the signal modification unit 650 will be described with reference to FIG. 4.

When the data signal of a current column line is input to an input of the signal modification unit 650 (step 410), it is determined whether predetermined data is repeated in the data signals, and whether the display quality deterioration due to crosstalk is induced by the data signals based on the determining whether the predetermined data is repeated (step 420). This process will now be described in greater detail with reference to FIG. 5.

Referring to FIG. 5, when a level of the data signals input to odd-numbered data lines d0, d2, d4, . . . repeatedly changes between a maximum gray and a minimum gray, and a level of the data signals input to even-numbered data lines d1, d3, d5, . . . repeatedly changes between the minimum gray and the maximum gray, a pixel displaying the maximum gray and a pixel displaying the minimum gray are alternately disposed along the row direction, and the common voltage Vcom of the upper panel 200 may be thereby different from the input value due to crosstalk such that the display quality deterioration such as the vertical line may be generated. In an exemplary embodiment, as shown in FIG. 5, three adjacent pixels PX1, PX2 and PX3 respectively represent one of primary colors such that a desired color is displayed by the combination of the three adjacent pixels PX1, PX2 and PX3. In an alternative exemplary embodiment, however, the connection relationship of the signal lines and the pixels of the liquid crystal display a may be different from the exemplary embodiment of the liquid crystal display shown in FIG. 5, and the method for determining whether the data signals induce the display quality deterioration may be different.

Accordingly, in an exemplary embodiment of the liquid crystal display, it is determined whether the pixel displaying the maximum gray and the minimum gray are disposed along the pixel column in the step 420 based on the arrangement of the signal lines and the pixels. Hereinafter, the data signals for the pixel displaying the maximum gray and the minimum gray along the pixel column is referred to as a quality deterioration pattern signal.

When the quality deterioration pattern signal is input to an n-th data line, a previous data (a), that is the data signal input to a previous data line, e.g., an (n−1)-th data line, stored in the memory and the previous data is compared with an input data, that is a current data input to the current line, e.g., the n-th data line (step 430). Through this comparison, if the quality deterioration pattern signal is not repeated (no), count=0 is set up (440*a*), and if the quality deterioration pattern signal is repeated (yes), count=1 is set up (step 440*b*). By repeatedly performing aforementioned step for all data lines until one frame is finished, a count sum (Count_total) is calculated and obtained (step 450). Then, if the one frame is finished (step 460), the count sum (Count_total) value is compared with a predetermined threshold value (step 470). Then, a result thereof is transmitted to the controlling signal generator 660, if the count sum (Count_total) value is not greater than the threshold value, a first control signal is generated (step 480*a*), and if the count sum (Count_total) value is greater than the threshold value, a second control signal is generated (step 480*b*).

Next, the first control signal and the second control signal are described with reference to FIG. 6. FIG. 6 is a signal timing diagram of an exemplary embodiment of a gate-on signal according to the invention.

Referring to FIG. 6, the first control signal is related to a first gate signal T1, and the second control signal is related to a second gate signal T2. In an exemplary embodiment, an interval H1 between the end of a gate-on signal CKV1, to which a first data signal D1 is input, and the time at which a second data signal D2 is input during a gate-on signal CKV2 of a next line, is relatively long in the first gate signal T1. In such an embodiment, an interval of the gate-on signals during an input of the corresponding data signal is relatively small such that the non-uniformity due to overlapping of the data signals is effectively prevented. In an exemplary embodiment, an interval H2 between the end of the gate-on signal CKV1, to which the first data signal D1 is input, and the time at which the second data signal D2 is input during the gate-on signal CKV2 of the next line, is relatively short in the second gate signal T2. In such an embodiment, an interval of the gate-on signals during an input of the corresponding data signal is substantially increased such that a time duration during which the data signal is input is substantially extended, and the data signal is thereby substantially charged to the liquid crystal layer 3 and the crosstalk may be substantially reduced. In such an embodiment, the non-uniformity of the common voltage Vcom due to the crosstalk is effectively prevented, and thereby the display quality such as the vertical line is substantially reduced.

In an exemplary embodiment of the liquid crystal display according to the invention, it is determined whether the data signal input thereto induces the display quality deterioration based on the structure of the signal lines and the pixels thereof. In such an embodiment, the display quality deterioration is effectively prevented by differently setting the duration of the gate-on signal relative to an input of the corresponding data signal and the non-uniformity due to the overlapping of the data signals is effectively prevented by limiting increasing of the duration of the gate-on signal.

Figure 7:
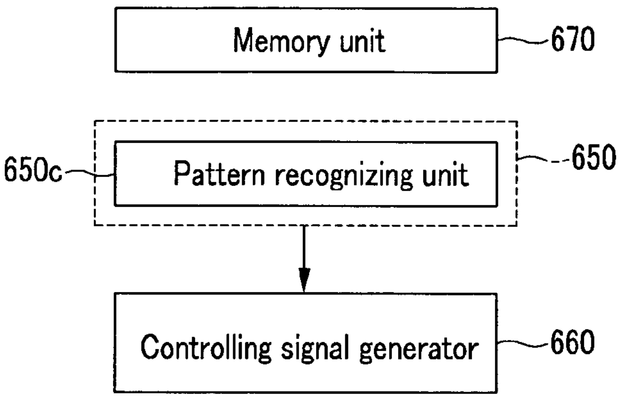
FIG. 7 is a block diagram of an alternative exemplary embodiment of a signal modification unit according the invention.
Figure 8:
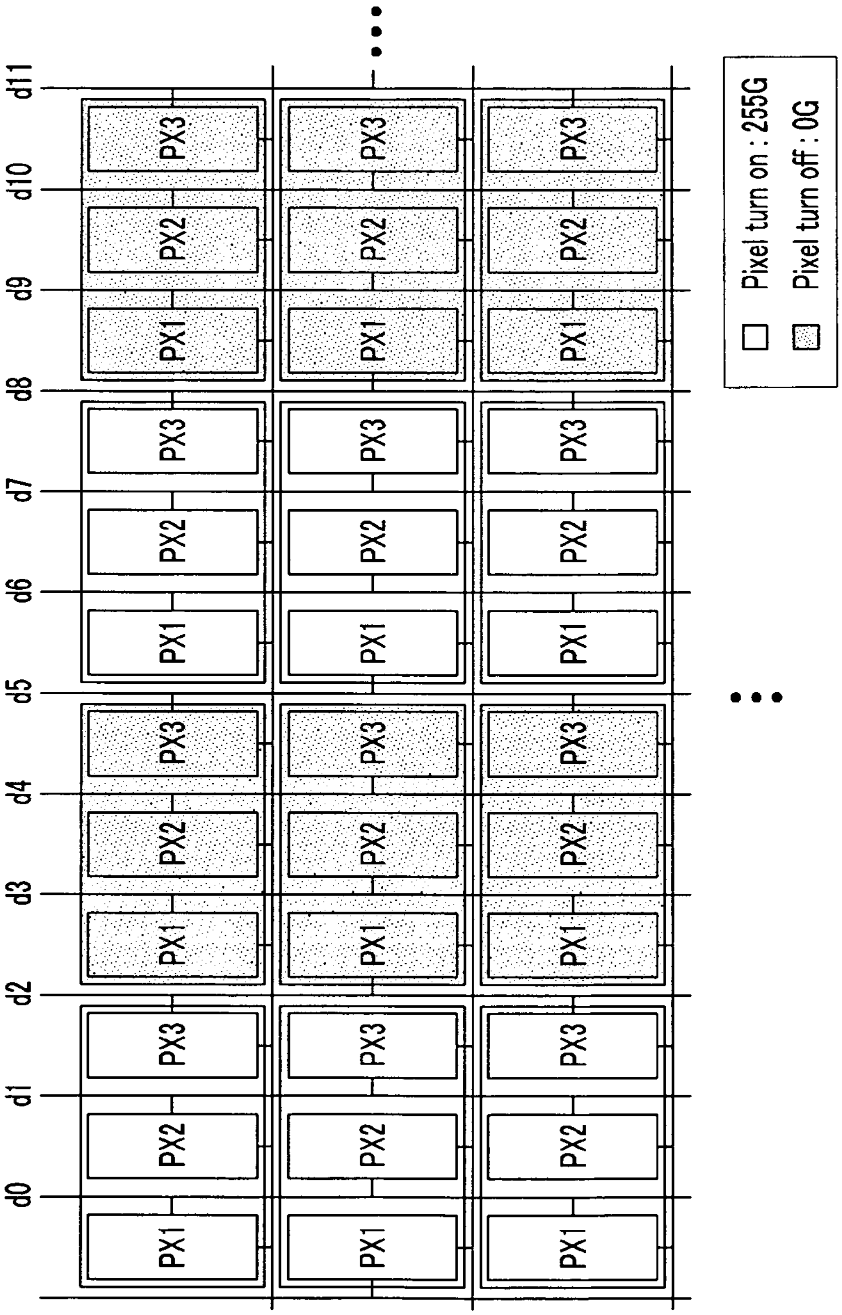
FIG. 8 is a block diagram showing data lines and pixels of an alternative exemplary embodiment of a liquid crystal display according to the invention.

Next, a structure and a driving method of an alternative exemplary embodiment of a liquid crystal display according to the invention will be described with reference to FIGS. 7 and 8. FIG. 7 is a block diagram of an alternative exemplary embodiment of a signal modification unit according to the invention, and FIG. 8 is a block diagram showing data lines and pixels of an alternative exemplary embodiment of a liquid crystal display according to the invention.

Referring to FIG. 7, the signal modification unit 650 includes a pattern recognizing unit 650*c*. The pattern recognizing unit 650*c* of the signal modification unit 650 reads a value of the data signal during a previous frame from a frame memory 670 disposed outside and compares the data signal of the previous frame with the data signal of a current frame to determine whether the data signal induces the display quality deterioration, the result thereof is transmitted to the controlling signal generator 660, and then the controlling signal generator 660 generates the first control signal or the second control signal based on the result of the pattern recognizing unit 650*c*, as shown in FIG. 6. In an exemplary embodiment of the liquid crystal display including the signal modification unit 650 shown in FIG. 7, at least a portion of the gate driver 400, the data driver 500, the signal controller 600 and the gray voltage generator 800 of the liquid crystal display may be integrated into a single chip, e.g., a single IC chip. In such an embodiment, a timing controller of the liquid crystal display may be disposed outside the single IC chip, and the signal modification unit 650 may be included in the single IC chip.

Next, the quality deterioration pattern signal under the connection relation of the signal lines and the pixels of an alternative exemplary embodiment of the liquid crystal display will be described. Referring to FIG. 8, two data lines d0 and d1 of three adjacent data lines d0, d1 and d2 may receive a signal having a level of the maximum gray, and the remaining data line d2 of the three adjacent data lines d0, d1 and d2 may receive a signal having a level repeatedly changing between the maximum gray and the minimum gray. Neighboring three adjacent data lines, e.g., next three adjacent data lines d3, d4 and d5, may receive a data signal of reversed values with respect to the three adjacent data lines d0, d1 and d2. In FIG. 8, three adjacent pixels PX1, PX2 and PX3 are pixels respectively representing one of primary colors, and display a desired color by the combination of colors displayed by the three pixels PX1, PX2 and PX3. As described above, the data signal of the pixel displaying the maximum gray and the minimum gray is alternately disposed every three adjacent pixel rows and may be referred to as the quality deterioration pattern signal. In the exemplary embodiment shown in FIG. 8, similarly to the signal modification unit 650 of the exemplary embodiment of the liquid crystal display shown in FIG. 3, whether the image to be displayed has the display quality deterioration may not be determined only through the data signal of one column stored to the line memory such that whether the image to be displayed has the display quality deterioration may be determined using the entire data signal stored to the frame memory.

In the exemplary embodiments of the liquid crystal display set forth herein, it is determined whether the input data signal is corresponding to the image to be displayed with the display quality deterioration under the structure of the signal line and the pixel of the liquid crystal display, and accordingly, the duration of the gate-on signal is differently set up, thereby the display quality deterioration may be prevented, the increasing of the duration of the unnecessary gate-on signal may be prevented, and resultantly the color non-uniformity according to the overlapping of the data signal may be prevented.

Figure 9:
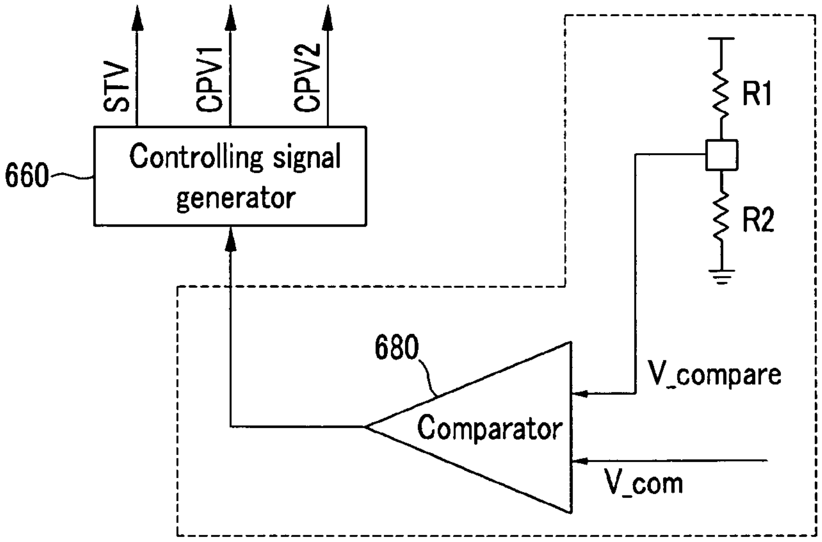
FIG. 9 is a block diagram of another alternative exemplary embodiment of a signal modification unit according to the invention.
Figure 10:
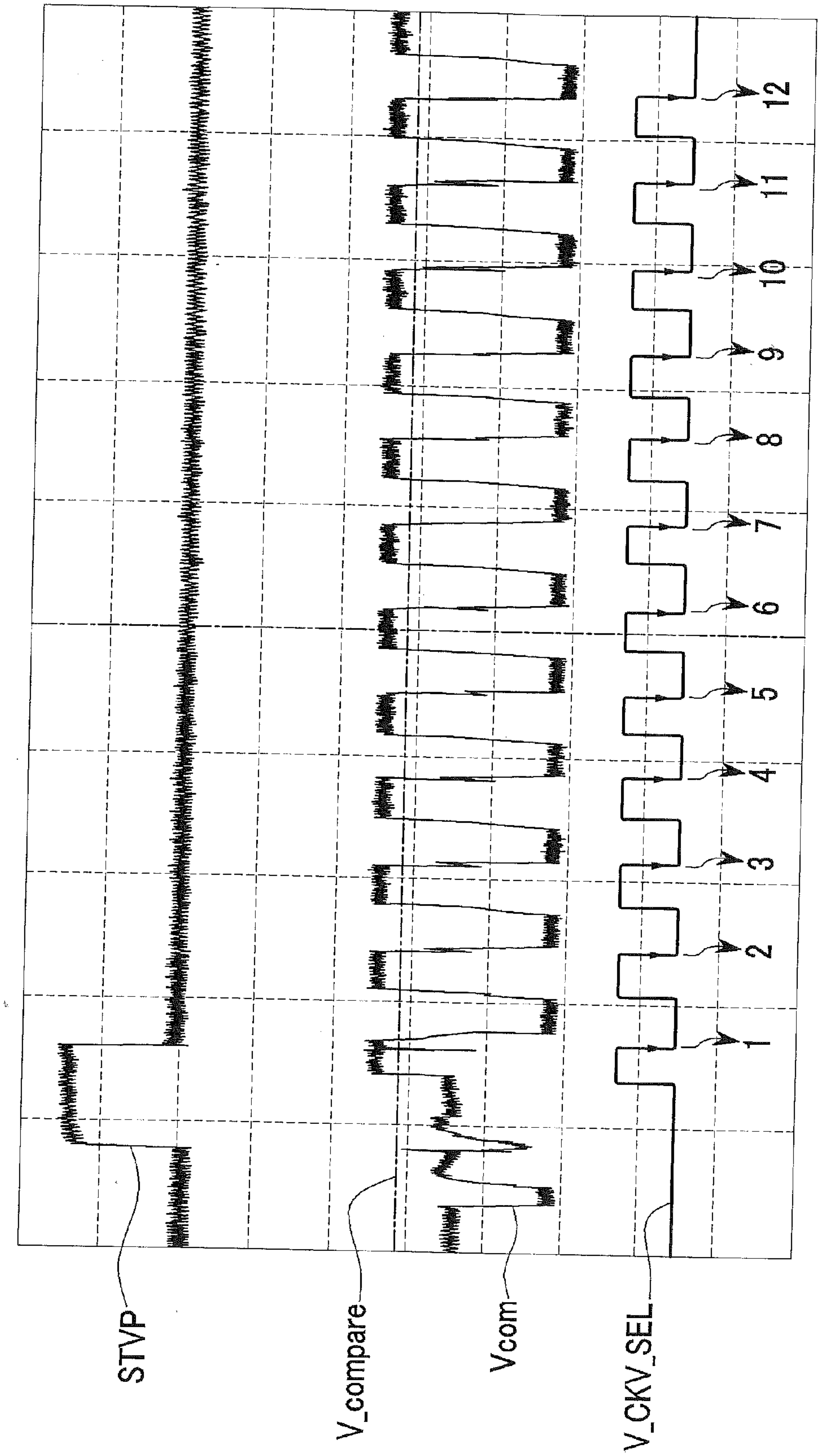
FIG. 10 is a signal timing diagram showing an exemplary embodiment of a signal modification operation according to the invention.

Next, a structure of an alternative exemplary embodiment of a liquid crystal display and a driving method will be described with reference to FIGS. 9 and 10. FIG. 9 is a block diagram of an alternative exemplary embodiment of a signal modification unit according to the invention, and FIG. 10 is a signal timing diagram showing an alternative exemplary embodiment of a signal modification operation according to the invention.

Referring to FIG. 9, an alternative exemplary embodiment of the signal modification unit 650 includes a comparator 680. The comparator 680 of the signal modification unit 650 compares the common voltage Vcom with a reference value (V_compare) to determine whether the common voltage Vcom is changed by the crosstalk based on the image signal input to the data line, the result thereof is transmitted to the signal generator 660, and thereby the controlling signal generator 660 generates the first control signal or the second control signal based on the result of the comparator 680, as shown in FIG. 6. Referring to FIG. 10, it is determined whether the image to be displayed has the display quality deterioration when the mismatched timings are counted and are more than a predetermined number by comparing the common voltage Vcom and the reference value (V_compare).

Figure 11:
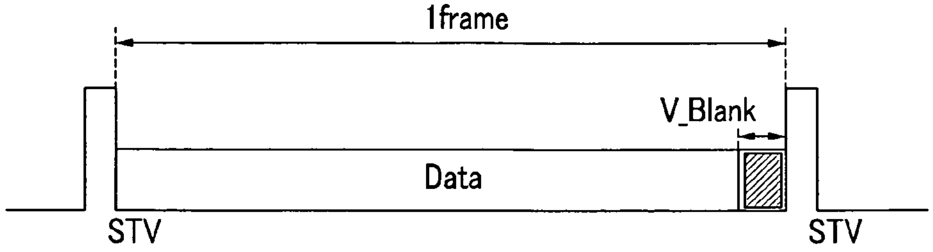
FIG. 11 is a waveform diagram of a signal applied to an exemplary embodiment of a liquid crystal display according to the invention.

This comparison operation of the comparator 680 of the signal modification unit 650 may be executed in a frame shown in FIG. 11, e.g., during a vertical blank period (V_Blank) of the frame when a data signal Data is not applied. The comparison operation of the comparator 680 is executed during the vertical blank period (V_Blank) without additional driving timing.

As described above, in an exemplary embodiment of the liquid crystal display according to the invention, the common voltage (V_com) and the predetermined reference value (V_compare) are compared to simply determine whether the image to be displayed has the display quality deterioration, and accordingly, the duration of the gate-on signal may be set up to be different such that the display quality deterioration is effectively prevented, and the color non-uniformity due to the overlapping of the data signal is effectively prevented by limiting of the duration of the gate-on signal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A driving apparatus for a liquid crystal display comprising:

a signal modification unit which modifies a signal based on a data signal input to the liquid crystal display, wherein the signal modification unit determines whether the data signal corresponds to an image to be displayed with a quality deterioration and outputs at least one of a first signal and a second signal, wherein the first signal is output which changes a duration of a gate-on signal relative to a time duration during which the data signal is input to be a first interval when the signal modification unit determines the data signal corresponds to the image to be displayed with the quality deterioration, wherein the second signal is output which changes the duration of the gate-on signal relative to a time duration during which the data signal is input to be a second interval when the signal modification unit determines the data signal does not correspond to the image to be displayed with the quality deterioration, and wherein the first interval is longer than the second interval.

2. The driving apparatus of claim 1, wherein the first signal and the second signal are control signals of a gate signal, and a duration of the gate-on signal corresponding to the first signal is greater than a duration of a gate-on signal corresponding to the second signal.

3. The driving apparatus of claim 2, wherein the signal modification unit comprises a line memory which stores the data signal input to a first data line of the liquid crystal display.

4. The driving apparatus of claim 3, wherein the signal modification unit compares the data signal stored in the line memory with the data signal input to a second data line of the liquid crystal display.

5. The driving apparatus of claim 2, further comprising a frame memory which stores data signals input during a previous frame, and wherein the signal modification unit compares the data signal stored in the frame memory with data signals input during a current frame.

6. The driving apparatus of claim 2, wherein the signal modification unit comprises a comparator which compares a common voltage of the liquid crystal display and a predetermined reference value.

7. The driving apparatus of claim 1, wherein the signal modification unit comprises a line memory which stores the data signal input to a first data line of the liquid crystal display.

8. The driving apparatus of claim 7, wherein the signal modification unit compares the data signal stored in the line memory with the data signal input to a second data line of the liquid crystal display.

9. The driving apparatus of claim 1, further comprising a frame memory which stores data signals input during a previous frame, and wherein the signal modification unit compares the data signal stored in the frame memory with the data signal input during a previous frame.

10. The driving apparatus of claim 1, wherein the signal modification unit comprises a comparator which compares a common voltage of the liquid crystal display and a predetermined reference value.

11. The driving apparatus of claim 1, wherein the signal modification unit determines whether the data signal corresponds to an image to be displayed with a quality deterioration and outputs at least one of a first signal and a second signal irrespective of whether the data signal input is for an odd or even pixel column.

12. A driving method of a liquid crystal display, the method comprising:

determining whether a data signal input to the liquid crystal display corresponds to an image to be displayed with a display quality deterioration based on an data signal input to the liquid crystal display; and outputting at least one of a first signal and a second signal based on the determining whether the data signal corresponds to the image to be displayed with the display quality deterioration, wherein the first signal is output which changes a duration of a gate-on signal relative to a time duration during which the data signal is input to be a first interval when the signal modification unit determines the data signal corresponds to the image to be displayed with the quality deterioration, wherein the second signal is output which changes the duration of the gate-on signal relative to a time duration during which the data signal is input to be a second interval when the signal modification unit determines the data signal does not correspond to the image to be displayed with the quality deterioration, and wherein the first interval is longer than the second interval.

13. The driving method of claim 12, wherein the first signal and the second signal are control signals of a gate signal, and a duration of the gate-on signal corresponding to the first signal is greater than a duration of a gate-on signal corresponding to the second signal.

14. The driving method of claim 13, wherein the determining whether the data signal input to the liquid crystal display corresponds to the image to be displayed with the display quality deterioration comprises comparing a data signal input to a first data line and stored in a frame memory with a data signal input to a second data line.

15. The driving method of claim 13, wherein the determining whether the data signal input to the liquid crystal display corresponds to the image to be displayed with the display quality deterioration comprises comparing data signals during a previous frame and stored in a frame memory with data signals currently input.

16. The driving method of claim 13, wherein the determining whether the data signal input to the liquid crystal display corresponds to the image to be displayed with the display quality deterioration comprises comparing a common voltage of the liquid crystal display with a predetermined reference value.

17. The driving method of claim 12, wherein the determining whether the data signal input to the liquid crystal display corresponds to the image to be displayed with the display quality deterioration comprises comparing a data signal input to a first data line and stored in a frame memory with a data signal input to a second data line.

18. The driving method of claim 12, wherein the determining whether the data signal input to the liquid crystal display corresponds to the image to be displayed with the display quality deterioration comprises comparing data signals stored in a frame memory which stores data signals input during a previous frame with data signals input during a current frame.

19. The driving method of claim 12, wherein the determining whether the data signal input to the liquid crystal display corresponds to the image to be displayed with the display quality deterioration comprises comparing a common voltage of the liquid crystal display with a predetermined reference value.

20. The driving method of claim 12, wherein the determining whether a data signal input to the liquid crystal display corresponds to an image to be displayed with a display quality deterioration based on an data signal input to the liquid crystal display is irrespective of whether the data signal input is for an odd or even pixel column.

* * * * *